United States Patent

Roest

Patent Number: 6,148,669
Date of Patent: Nov. 21, 2000

[54] ACCELERATION SENSOR WITH A SPHERICAL INDUCTANCE INFLUENCING MEMBER

[75] Inventor: Wouter Roest, Eindhoven, Netherlands

[73] Assignee: U.S. Philips Corporation, New York, N.Y.

[21] Appl. No.: 09/177,961

[22] Filed: Oct. 23, 1998

[30] Foreign Application Priority Data

Jun. 29, 1998 [EP] European Pat. Off. ............ 98202157

[51] Int. Cl.⁷ .................................................. G01P 15/11
[52] U.S. Cl. ...................... 73/514.31; 73/493; 33/366.25
[58] Field of Search ............................ 73/514.31, 514.17, 73/514.12, 493, 654; 33/366.25, 366.12, 366.11

[56] References Cited

U.S. PATENT DOCUMENTS

| | | | |
|---|---|---|---|
| 2,979,959 | 4/1961 | Clurman | 73/514.31 |
| 3,491,600 | 1/1970 | Kasparian | 73/514.17 |
| 3,771,370 | 11/1973 | Takagi et al. | 73/514.31 |
| 3,978,715 | 9/1976 | Farstad | 73/514.31 |
| 4,365,513 | 12/1982 | Iwasaki | 73/517 |
| 5,835,077 | 11/1998 | Dao et al. | 73/514.09 |

FOREIGN PATENT DOCUMENTS

| | | |
|---|---|---|
| 2430710A1 | 1/1976 | Germany . |
| 4418292A1 | 11/1995 | Germany . |
| 9-280942 | 10/1997 | Japan . |
| 9-311762 | 12/1997 | Japan . |
| 10-082608 | 3/1998 | Japan . |
| 10-213405 | 8/1998 | Japan . |
| 9300152 | 8/1994 | Netherlands . |

*Primary Examiner*—John E. Chapman
*Attorney, Agent, or Firm*—Tony E. Piotrowski

[57] ABSTRACT

An acceleration sensor (100) includes a spherical chamber (104) accommodating a spherical member (106) made from an inductance influencing material. The member is inductively coupled to one or more coils (110) outside the chamber. A force on the sensor pulls the member to a certain position in the chamber, which position corresponds to the direction of the force. The position is measured on the basis of the self induction of the coil or coils. In a steady state, the position of the member is representative of the orientation of the sensor with respect to the field of gravity.

15 Claims, 7 Drawing Sheets

ACCELERATION SENSOR WITH A SPHERICAL INDUCTANCE INFLUENCING MEMBER

BACKGROUND OF THE INVENTION

The invention relates to an acceleration sensor comprising:

a non-conducting, non-magnetic housing with a chamber which has a circular cross section in a first plane, an inductance influencing member which resides inside the chamber and has a circular cross section in the first plane, and a first coil which is inductively coupled to the inductance influencing member.

The invention further relates to a tracking device with such a sensor.

The invention further relates to a head mounted display with such a tracking device.

The invention further relates to a mouse with such a tracking device. An acceleration sensor of the above kind is described in a Dutch patent application, published under number 9300152. The known acceleration sensor has a spherical chamber with a ball of soft magnetic material. One or more coils are wound around the chamber, each enclosing the ball to a certain extent. In a certain orientation of the acceleration sensor, the coil or set of coils together with the enclosed ball have a certain self induction. When the orientation changes, the ball moves inside the chamber under the influence of the field of gravity and the self induction changes. This change is detected and used as a trigger in an alarm system. A product can thus be protected against theft by fixing such an acceleration sensor to the product. The known acceleration sensor only detects whether a change of orientation takes place, without qualifying the amount of change, and is incapable of determining the direction of the change.

SUMMARY OF THE INVENTION

It is an object of the invention to provide an acceleration sensor of the kind set forth with improved measurement of the orientation. This object is achieved according to the invention in an acceleration sensor which is characterized in that the first coil is positioned in a second plane outside the chamber, the second plane not being parallel to the first plane. Such an acceleration sensor can advantageously be used as a tilt sensor for measuring the orientation of the sensor with respect to the field of gravity in the first plane. A particular orientation results in a particular position of the member inside the chamber since the member is pulled towards the deepest point. This particular position corresponds to a particular distance between the coil and the member. By measuring the actual value of the self induction of the coil, this distance between the inductance influencing member and the coil is determined and the orientation of the sensor can be calculated. So the acceleration sensor is not only capable of detecting whether a change in orientation has taken place but is also capable of indicating the direction and amount of change of orientation. Given the known orientation of the field of gravity, the acceleration sensor can determine the absolute orientation of the sensor in the first plane.

In one embodiment of the present invention the difference between cross section diameters of a chamber and a member is small so that the rotational movement of the member inside the chamber can be regarded as a translation orthogonal to the second plane of the coil. So the fact that the member moves in a direction in this second plane, because of its moving up and down with respect to the field of gravity, can be neglected. Furthermore, such a small difference makes that the movements of the member take place over such a limited distance that there is a linear relation between the self induction of the coil and the distance between the coil and the member. The linear relation makes it unnecessary to calibrate the acceleration sensor over the range of distances the member may cover, because a given point of the linear relation fully qualifies this relation. There is no need for a table of measurements or a complex function describing the relation between the self induction and the distance between the member and the coil. The distance can simply be calculated from the measured self induction.

In another embodiment, two coils are used to carry out a differential measurement of the position of the member relative to the center of the chamber. Such a differential measurement is more stable than a single coil measurement. A measurement of the induction of a single coil is influenced by various phenomena, like a change of temperature. The effects of such a phenomenon for the two coils cancel each other in a differential measurement, because the coils are connected to the measurement circuitry in a reversed way.

In another embodiment, an acceleration sensor measures the orientation in three directions, in each direction a differential measurement can thus be carried out by combining the two coils lying in the respective planes. The construction of this acceleration sensor is comparatively simple since the housing may be a plastic cube with a coil fixed to each of the six sides and with a hollow, spherical chamber.

In another embodiment, fluid is provided in the chamber to damp movements of the member in the chamber. When, for a given configuration of the chamber and the member, the changes of orientation are such that the member may overshoot, fluid can be used to damp the movement and avoid the overshoot.

It is a further object of the invention to provide a tracking device for detecting the orientation in at least one direction. This object is achieved according to the invention in a tracking device comprising a sensor, and first signal means for generating, on the basis of the actual self induction of at least one of the coils, a first signal representative of the orientation of the device with respect to the field of gravity. The sensor according to the invention can easily be used to obtain a signal that is representative of the orientation of the device with respect to the field of gravity.

In another embodiment, the tracking device also determines the strength of the force. This makes it a more versatile device which can also be used in accelerometers. On the basis of the self induction of the coils the position of the inductance influencing member with respect to the center of the chamber is determined and a current is applied to the respective coils so as to pull the member towards the center against the force acting on it. In the steady situation, the currents through the coils are representative of the direction and the strength of the force. This makes it possible to measure a tilt of the sensor and an acceleration of the sensor at the same time. The measured force is a combination of the force of the field of gravity and a force resulting from the motion of the sensor. Subtracting the force of the field of gravity and integrating the resultant force enables calculation of translation movements of the sensor and tracking of the position of the sensor. Another advantage of this embodiment is that the sensor is more simple to manufacture since it need not to have a chamber having a spherical interior. The member does not rotate inside the chamber and the orientation of the sensor is not detected through the relative position of the member inside the hollow chamber but through the currents in the respective coils required to lift the member and retain it in the center. The member still has a spherical shape, since it must interact with the coils in the same way in all directions, but this shape need be as strictly spherical as in the previous embodiments.

In another embodiment, the tracking device is capable of determining any change in orientation with respect to a reference orientation, irrespective of the orientation of the field of gravity or the geomagnetic field. Whereas the behavior of a single sensor, i.e. a magnetic sensor or an acceleration sensor, deteriorates for changes in orientation in a certain direction, the tracking device wherein the two types of sensor supplement each other does not suffer from such deterioration. The magnetic sensor is less adequate for changes of orientation around the direction of the geomagnetic field and the acceleration sensor is less adequate for changes of orientation around the direction of the field of gravity. Since these two directions are different and do not coincide, the combined sensor readings will lead to correct measurement of the orientation of the tracking device.

A head mounted display can advantageously be equipped with a tracking device according to the invention. The tracking device determines the orientation of the head mounted display and the images displayed can be adapted to the actual orientation.

A mouse can advantageously be equipped with a tracking device according to the invention. Such a mouse does not need a surface to keep track of its movements and the user of the mouse may take the mouse in the hand so as to operate it. The tracking device determines the orientation of the mouse which is translated to co-ordinates or co-ordinate changes for control of a cursor on the display of the system with which the mouse co-operates. Such a mouse need not be physically connected to the system but may transmit its data to the computer via an infrared link, radiographic link or the like.

Further advantageous embodiments of the invention are recited in the dependent claims.

BRIEF DESCRIPTION OF THE DRAWING

The invention and its attendant advantages will be further elucidated with the aid of exemplary embodiments and the accompanying schematic drawings, therein.

Corresponding features in the various Figures are denoted by the same references.

DETAILED DESCRIPTION OF THE PREFERRED EMBODIMENTS

Figure 1:
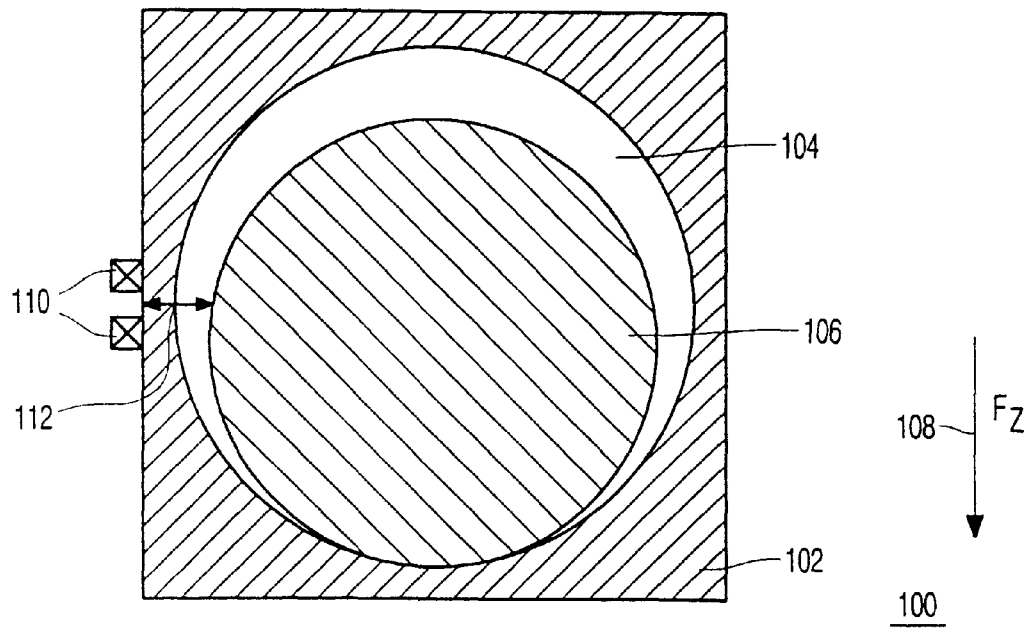
FIG. 1 shows an acceleration sensor according to the invention.

FIG. 1 shows an acceleration sensor according to the invention. The acceleration sensor 100 has a plastic housing 102 with a hollow chamber 104. The chamber 104 has a circular cross section in the plane of the drawing. The chamber accommodates a freely movable member 106 which also has a spherical cross section in the plane of the drawing. Under the influence of the field of gravity 108, the member will be pulled to the deepest position in the chamber. Outside the housing there is provided a coil 110 whose windings are situated in a plane perpendicular to the plane of the drawing and its axis of symmetry is situated in the plane of the drawing. The composition of the member 106 is such that it influences the self induction of the coil 110. This influence varies as a function of the distance 112 between the member and the coil and is stronger when the member is closer to the coil. The self induction of the coil can be used as an indicator of this distance. In a preferred embodiment of the sensor, the member is made of brass. An alternating current applied to the coil causes so-called Eddy currents to occur in the member in response. As a result, the self induction of the coil appears to be smaller due to the presence of the member. When the distance 112 decreases, the self induction decreases and when the distance 112 increases the self induction increases. The member may be made of other conducting, non-magnetic material like copper or aluminium and need not to be solid. Another suitable member is a glass sphere covered with a thin layer of brass. In another embodiment of the sensor, the member is made of ferrite. The member then acts as a core of the coil, thereby increasing the self induction of the coil. When the member is closest to the coil, this effect and the self induction are greatest and when the member is moved away from the coil, the effect and the self induction of the coil diminish.

The construction of the hollow chamber 104 and the member 106 is such that a rotation in the plane of the drawing causes the member to assume a new, deepest position. This results in a particular distance 112 which can be measured by measuring the self induction of the coil. So the actual value of the self induction of the coil is representative of the orientation of the sensor in the plane of the drawing. The sensor is calibrated to obtain the quantitative relation between the orientation of the sensor and the value of the self induction. A subsequent measurement of the self induction can then directly be translated into the actual orientation of the sensor.

The sensor shown in FIG. 1 can determine the orientation of the sensor in the plane of the drawing, so for rotations around an axis orthogonal to that plane. A sensor for determining rotations around any of the three axes spanning up the three dimensional space comprises three coils 110, each arranged in a plane orthogonal to the other two and at mutually identical distances from the center of the chamber. The member of this sensor is a sphere since this constitutes a circular cross section perpendicular to each of the three coils. The interior of the chamber has a spherical shape for the same reason. This sensor with three coils need not be calibrated, since the three measured self induction values define a vector to the position of the member, relative to the center of the chamber. Furthermore, this vector directly indicates the orientation of the force acting on the member. When the sensor is used as a tilt sensor, the vector directly indicates the orientation of the sensor with respect to the field of gravity.

The hollow chamber may be filled with a fluid to avoid overshoot of the member upon assuming a new position after a rotation of the sensor. Whether or not there is a risk of overshoot depends on the dimensions and materials of the chamber and the member. In the preferred embodiment, a brass ball of a diameter of 9.5 mm in a chamber of a diameter of 10 mm did not exhibit overshoot and did not need a fluid in the chamber. The ball in that embodiment is critically damped due to the friction between the ball and the chamber.

Figure 2:
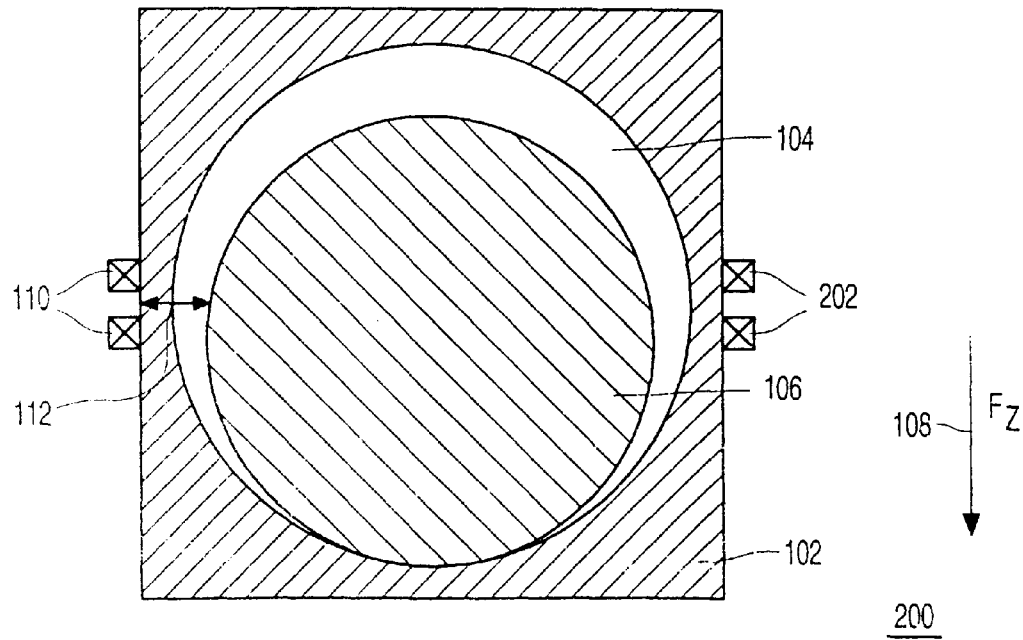
FIG. 2 shows an acceleration sensor according to the invention with two coils.

FIG. 2 shows an acceleration sensor according to the invention with two coils. The construction of the acceleration sensor 200 is the same as that of the acceleration sensor 100, but includes an additional coil 202. The coil 202 has its windings arranged in a plane perpendicular to the plane of the drawing and its axis of symmetry is situated in the plane of the drawing. The coil 202 is positioned at the side opposite the coil 110. The coils 110 and 202 are positioned symmetrically with respect to the center of the circular cross section of the chamber 104. The two coils 110 and 202 enable a differential measurement of the position of the member to be carried out. Such a differential measurement is more stable and more sensitive than a single measurement. An effect influencing the measurement of the self induction of a single coil is now cancelled by the same effect influencing the other coil in the same way. An example in this respect is the influence of the temperature on the measurement of the self induction.

Figure 3:
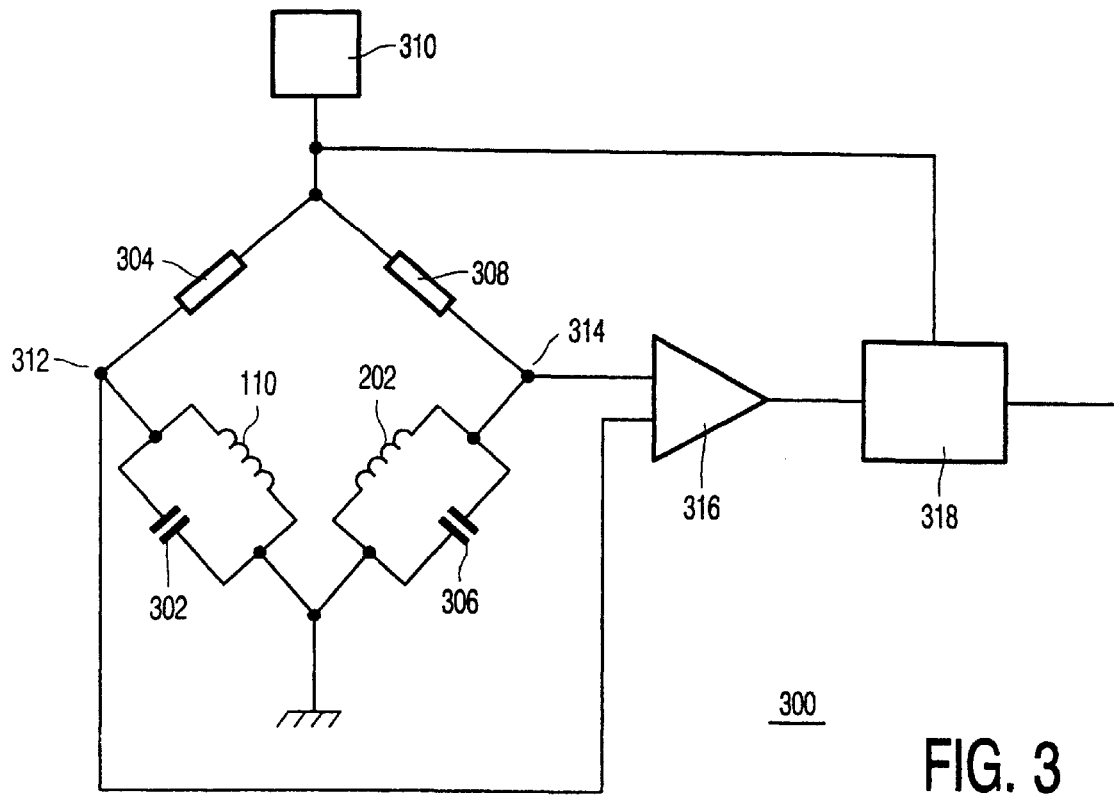
FIG. 3 schematically shows the circuitry for a differential measurement.

FIG. 3 schematically shows the circuitry for a differential measurement. The circuitry 300 comprises a capacitor 302 parallel to the coil 110 and a resistor 304 in series with the coil 110, forming the left part of a bridge. The circuitry 300 further comprises a capacitor 306 parallel to coil 202 and a resistor 308 in series with the coil 202. The resistor 304 and the parallel arrangement of the coil 110 and the capacitor 302 form the left side of a bridge circuit. The resistor 308 and the parallel arrangement of the coil 202 and the capacitor 306 form the right side of that bridge circuit. A frequency generator 310 supplies the bridge with a frequency of about 1 MHz, being the same as the frequency of the LC circuits 110,302 and 202,306, and the output of the bridge is measured between connection points 312 and 314. In the preferred embodiment, the self induction of the coils 110 and 202 is 15 H, the capacitance of the capacitors 302 and 306 is 2.8 nF and the resistance of the resistors 304 and 308 is 1.5 kohm. When the member 106 in the chamber of the sensor is in the middle between the two coils 110 and 202, the bridge is balanced. In this position, the member influences each of the coils to the same extent and the coils will have the same self induction. When the orientation of the sensor changes and the member 106 assumes a different position with respect to the coils 110 and 202, the member influences one coil differently from the other. So the coils no longer have the same self induction and the bridge gives output in relation to this difference in self induction. The output is a signal of the same frequency as the input signal of the bridge. The output of the bridge is fed, via an amplifier 316, to a synchronous detector 318 whose output signal has a value that directly indicates the phase shift between the left side of the bridge at the point 312 and the right side of the bridge at the point 314.

Figure 4:
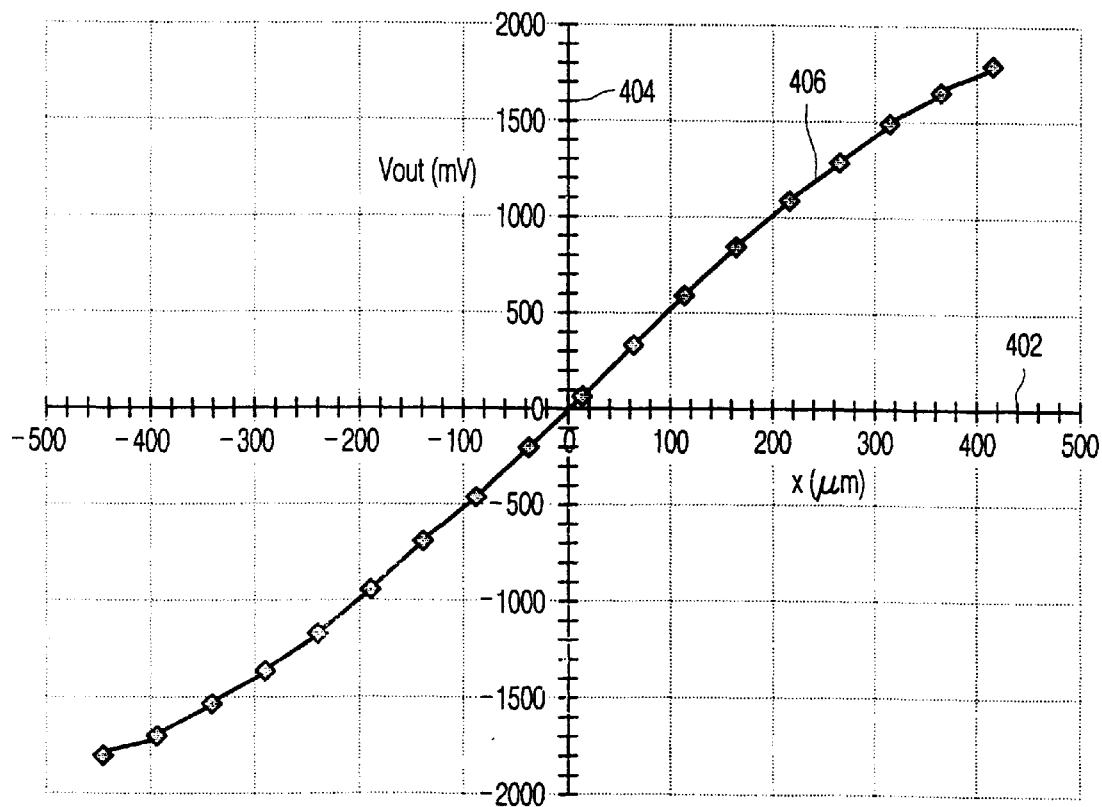
FIG. 4 shows the output of the differential measurement circuit according to the invention.

FIG. 4 shows the output of the differential measurement circuit according to the invention. The horizontal axis 402 indicates the position of the member 106 relative to the middle position between the coils 110 and 202. The vertical axis 404 indicates the output of the measurement circuit 300. The line 406 represents the output for the various positions of member 106. The actual value is given merely by way of example, since the output can easily be amplified to a desired range by the amplifier 316. In the preferred embodiment the output is in the range of between −2V and +2V.

Figure 5:
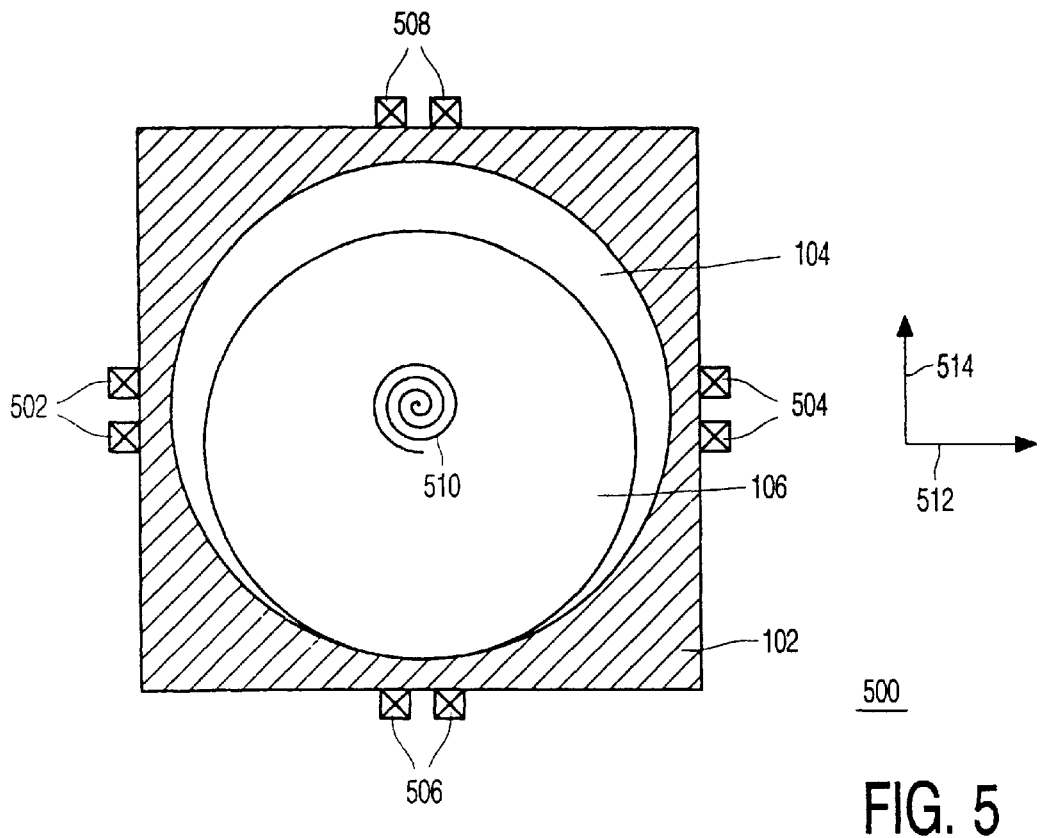
FIG. 5 shows an acceleration sensor for measuring the orientation in three directions.

FIG. 5 shows an acceleration sensor for measuring the orientation in three directions. The sensor 500 has a housing 102 provided with a hollow, spherical chamber 104. Inside the chamber there is arranged a freely movable, spherical member 106. The sensor comprises a pair of coils 502, 504 for measuring the movements of the member 106 in the direction 512 and a pair of coils 506, 508 for measuring the movements of the member 106 in the direction 514. The sensor also has a pair of coils for measuring the movements of the member 106 in the direction orthogonal to the plane of drawing, of which pair only the front coil 510 is shown. The external shape of the housing is a cube, each side of the cube carrying one of the coils at its center. In each of the three directions, the position of the member can be determined with a differential measurement as described above. In the preferred embodiment, the edge of the cubic housing has a length of 10 mm and the thickness of the wall of the housing amounts to 0.1 mm at its center. The diameter of the member 106 is 9.5 mm. The housing is made of plastic and the ball of brass. Each of the coils has 80 windings, an outer diameter of 3 mm, an inner diameter of 1 mm and a thickness of 0.35 mm.

Figure 6:
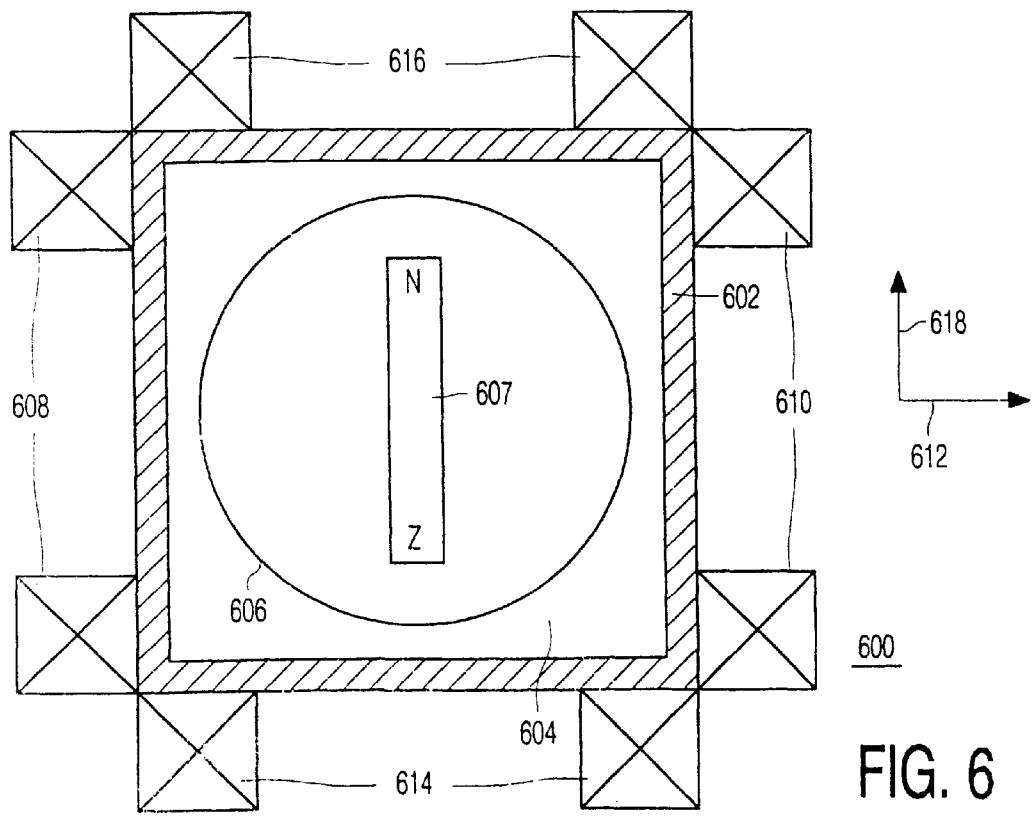
FIG. 6 shows an alternative acceleration sensor according to the invention.

FIG. 6 shows an alternative acceleration sensor according to the invention. Sensor 600 has a housing 602 with a hollow chamber 604. The hollow chamber accommodates a spherical member 606 comprising a permanent magnet 607. The hollow chamber need not be spherical. The member is further made of a conducting, non-magnetic material, in this case being aluminium. The sensor comprises a pair of coils 608, 610 for measuring the movements of the member 606 in the direction 612 and a pair of coils 614, 616 for measuring the movements of the member 106 in the direction 618. The sensor also has a pair of coils for measuring the movements of the member 106 in the direction orthogonal to the plane of drawing, which pair is not shown in the figure. The position of the member relative to the center of the housing can be determined as described above. The coils are larger than in the embodiment shown in FIG. 5 and are arranged to produce a comparatively strong magnetic field. This field is strong enough to lift the member 106, through its incorporated permanent magnet, towards the center of the chamber against the gravitational force.

Figure 7:
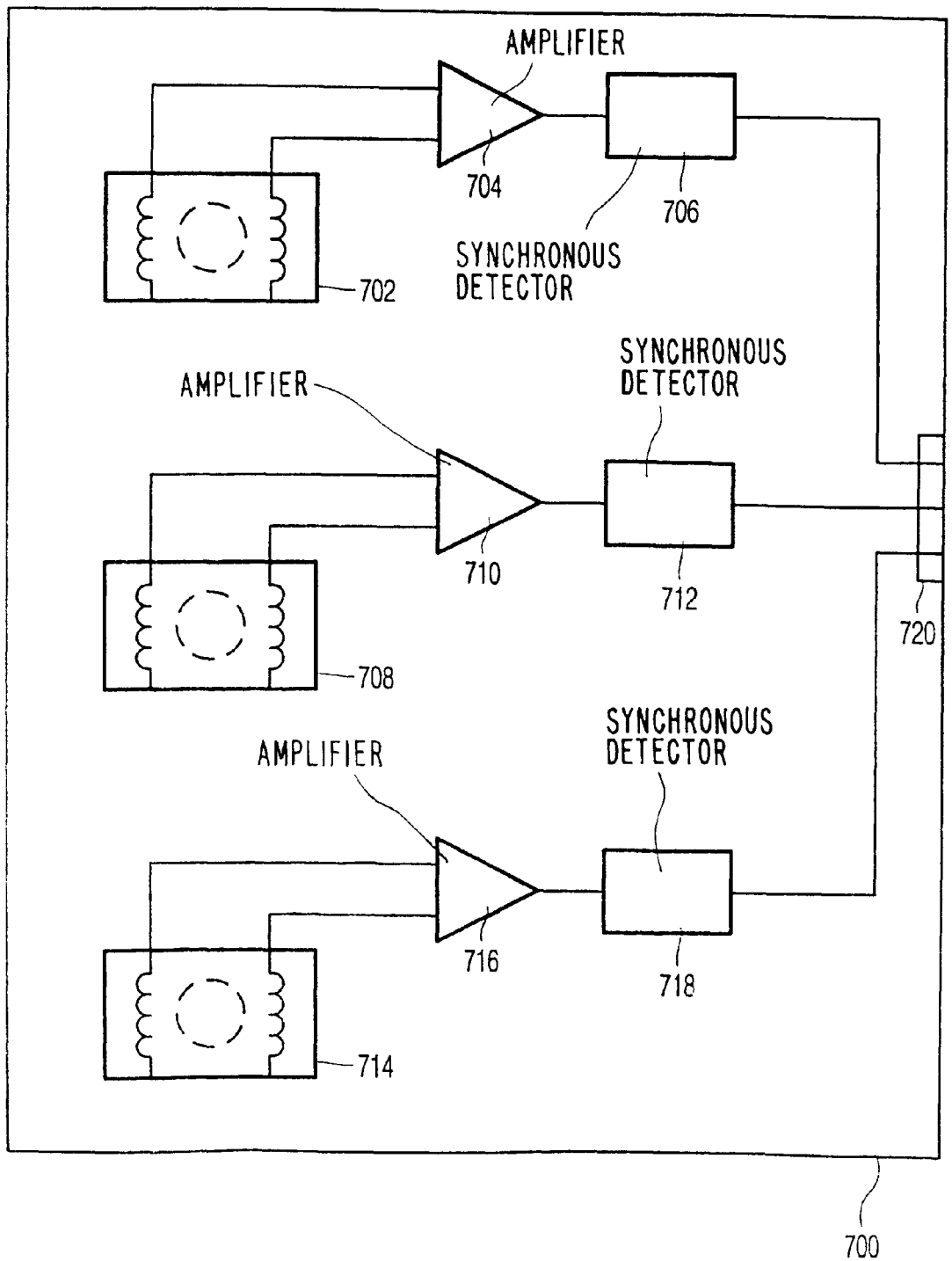
FIG. 7 shows a tracking device according to the invention.

FIG. 7 shows a tracking device according to the invention. The tracking device 700 is arranged to track changes in orientation in three directions and comprises to this end an acceleration sensor which is arranged to determine the orientation in three directions as shown in FIG. 5. However, a tracking device for tracking changes in only two or even in one direction is also feasible. For such a tracking device, the acceleration sensor need not be capable of determining the orientation in all three directions. The tracking device 700 comprises a first pair of coils 702 for determining the orientation in a first direction. Measuring the orientation is carried out with an amplifier 706 and a synchronous detector 704 as shown in FIG. 3 and described above. Similarly, for the second direction the tracking device comprises a pair of coils 708, orthogonal to the coils 702, an amplifier 710 and a synchronous detector 712. Similarly, for the third direction the tracking device comprises a pair of coils 714, orthogonal to the coils 702 and 708, an amplifier 716 and a synchronous detector 718. Via connector 720, the tracking device makes the three signals, representative of the orientation in the three respective direction, available for subsequent processing.

Figure 8:
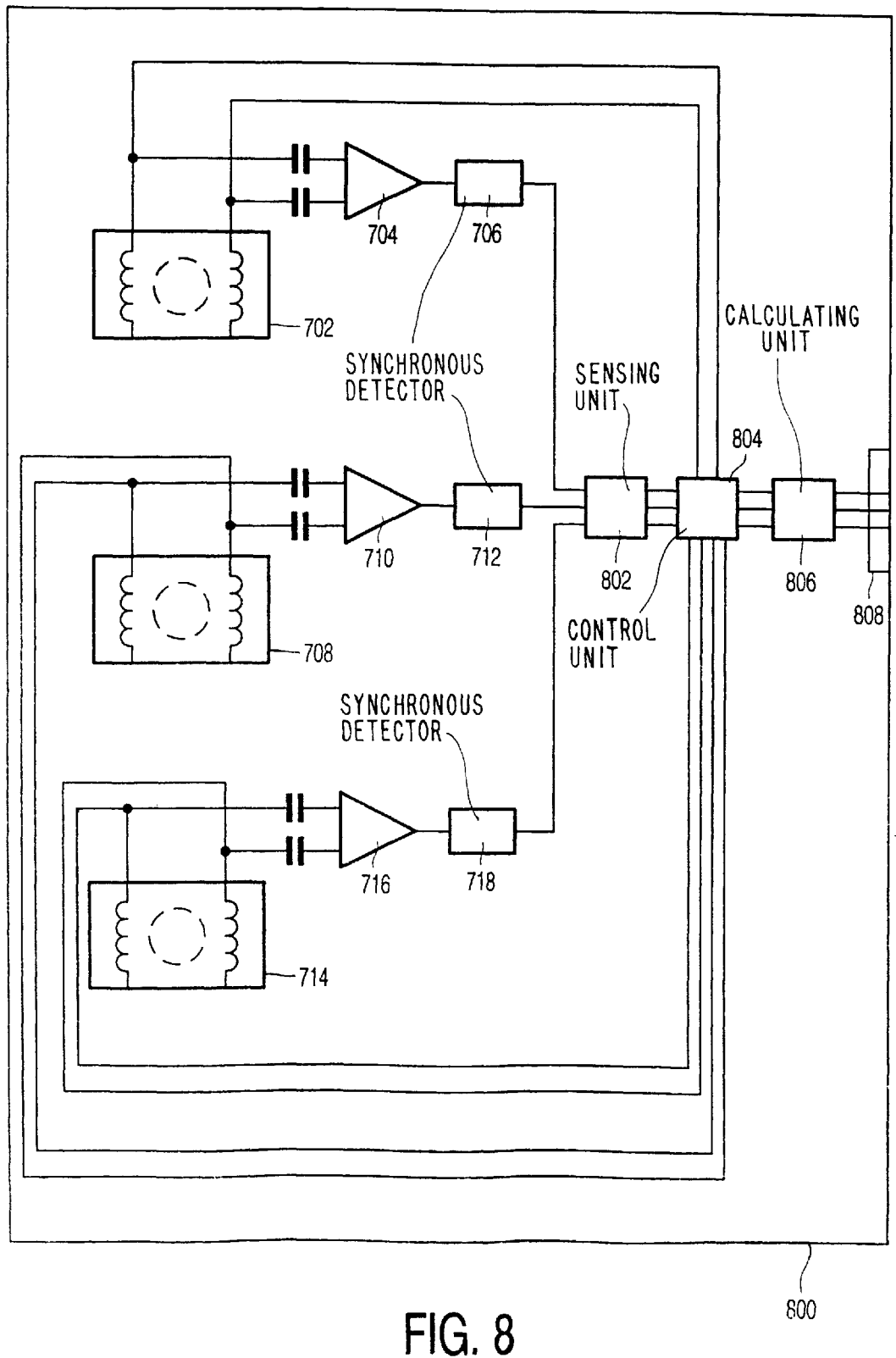
FIG. 8 shows an alternative tracking device according to the invention.

FIG. 8 shows an alternative tracking device according to the invention. The tracking device 800 comprises an acceleration sensor as shown in FIG. 6. For each of the three directions, the tracking device comprises a pair of coils, an amplifier and a synchronous detector to generate a signal that is indicative of the position of the member 606 relative to the center of the chamber. This position is determined in a position sensing unit 802 and applied to a control unit 804. On the basis of the position of the member 106, the control unit determines what current must be applied to each of the coils in order to lift the member towards the center of the chamber and applies these currents to the relevant coils. The sensing current through the coils for determining the position of the member is a high frequency alternating current, whereas the control current applied by the control unit 804 is a direct currents. So the control current from the control unit does not interfere with the sensing current. In the steady state, i.e. where the magnetic field generated by the control currents neutralize the gravitational force acting on the member, the values of the control currents through the respective coils are indicative of the strengths of the gravitational force on the member in the three directions. The value and the direction of the gravitational force can thus be calculated from the control current. The unit 806 calculates the orientation of the tracking device in the three directions from the control current and applies it to connector 808 for further processing.

Figure 9:
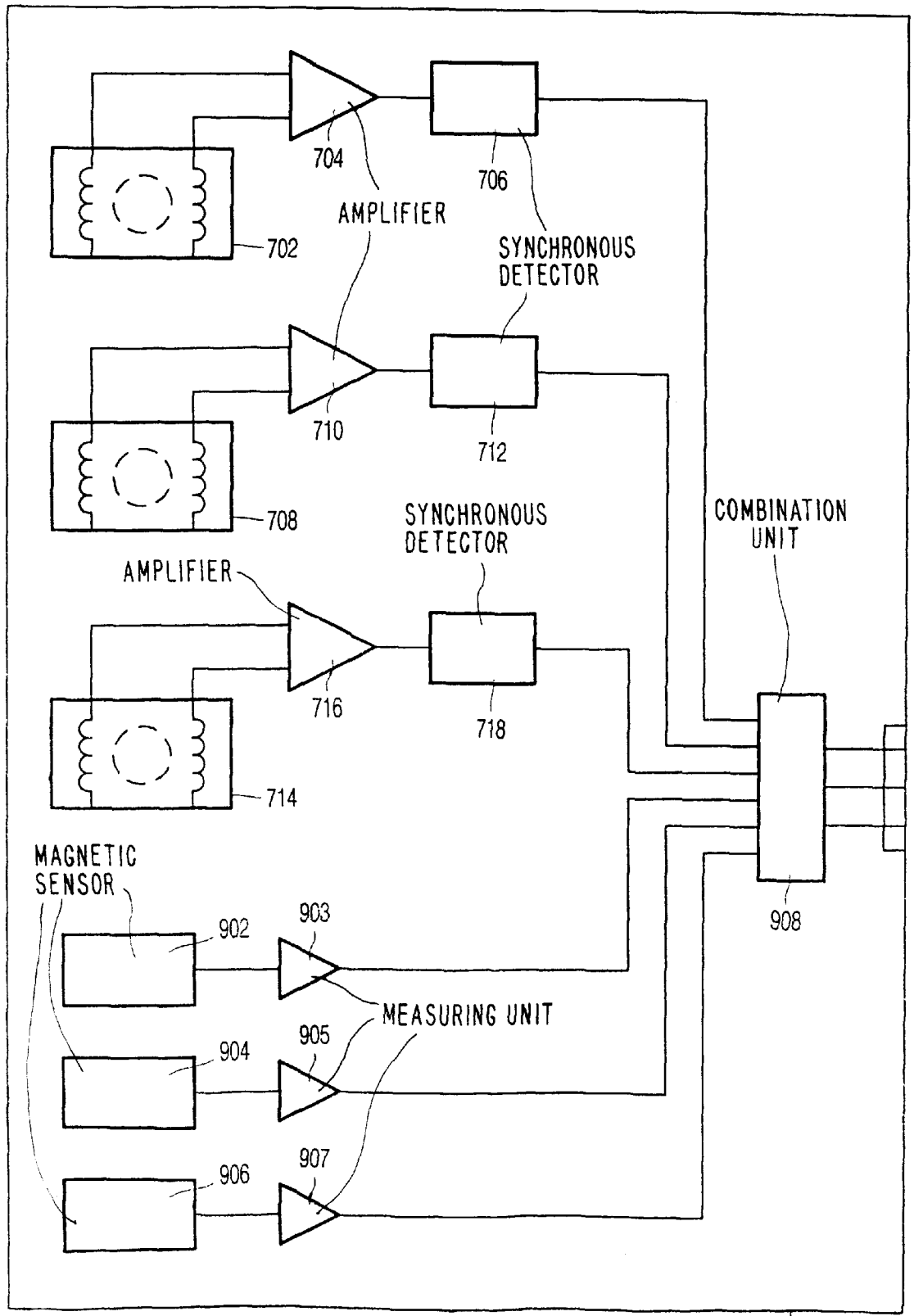
FIG. 9 shows a tracking device including an acceleration sensor and a magnetic sensor.

FIG. 9 shows a tracking device including an acceleration sensor and a magnetic sensor. For each of the three directions, the tracking device 900 comprises a pair of coils, a detector and an amplifier as shown in FIG. 7 forming an acceleration sensor as described above. The tracking device also includes a magnetic sensor 902 and a measuring unit 903 for measuring the geomagnetic field in a first direction. In a preferred embodiment, this magnetic sensor comprises the MR sensor KMZ51 marketed by Philips. The tracking device 900 also comprises a magnetic sensor 904 and a measuring unit 905 for measuring the geomagnetic field in a second direction and a magnetic sensor 906 and a measuring unit 907 for measuring this field in a third direction. The three magnetic sensors are arranged in such a way that the three measuring directions are orthogonal with respect to each other and together form an electronic compass. The three signals from the respective magnetic sensors are indicative of the orientation of the tracking device with respect to the geomagnetic field and can be used to track changes of the orientation of the tracking device.

The acceleration sensor is not capable of tracking every change in the orientation of the tracking device. A rotation around an axis parallel to the direction of the field of gravity, i.e. a rotation in the vertical plane, cannot be detected. The member of the acceleration sensor will then remain in the same position relative to chamber and no change will be detected. A similar situation occurs for the three magnetic sensors. A rotation around an axis parallel to the direction of the geomagnetic field cannot be detected. The respective components in each of the three magnetic sensors remain the same and the change will not be detected. Generally speaking the direction of the field of gravity does not coincide with the direction of the geomagnetic field. Therefore, if one of the two types of sensor cannot track the orientation, the other will be able to do so. So a tracking device which includes the two types of sensor and combines their outputs can completely track the orientation. To this end, the tracking device includes a combination unit 908 for combining the signals of the acceleration sensor being indicative of the orientation of the tracking device with respect to the field of gravity, and the signals of the magnetic sensor, being indicative of the orientation of the tracking device with respect to the geomagnetic field. From these signals the combination unit derives signals that are more stable and more reliable in indicating the orientation of the tracking device in the three directions. The output of the acceleration sensor represents a first vector and the output of the magnetic sensor represents a second vector. Due to the respective orientations of the field of gravity and of the geomagnetic field, the first and the second vector are not orthogonal. For the sake of subsequent processing, the length of the vectors is made equal either by adjusting the signal amplification or by a normalization step. The vectors are the subtracted so as to obtain a third vector and added together so as to obtain a fourth vector. The third and the fourth vector are orthogonal to each other and are subsequently normalized. The set of normalized vectors completely represents the orientation of the tracking device.

Figure 10:
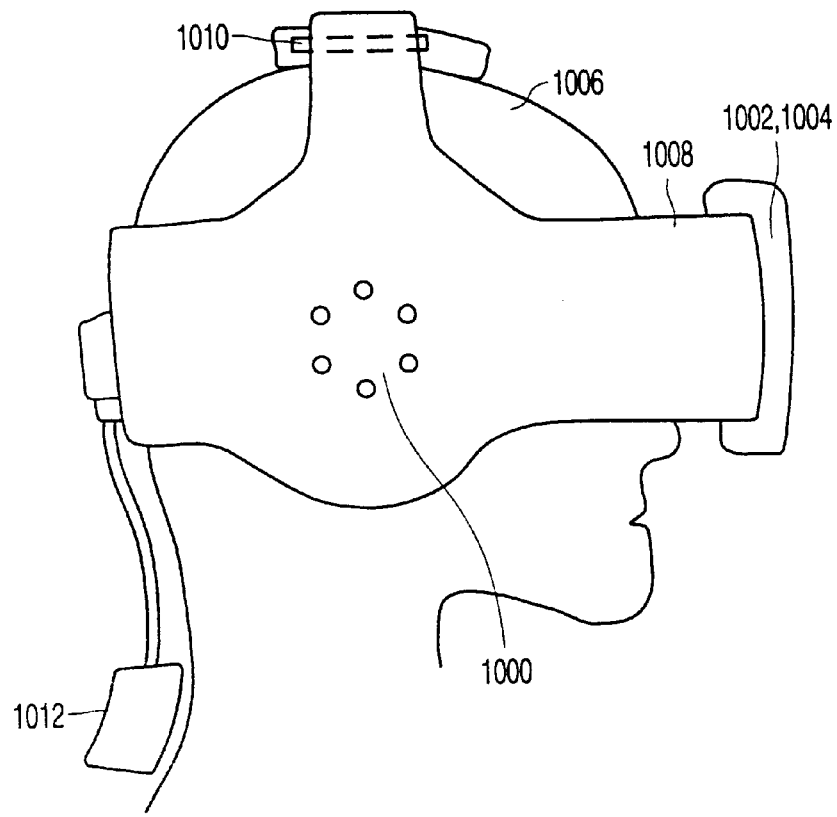
FIG. 10 shows a head mounted device according to the invention, FIG. 11 schematically shows a mouse according to the invention.

FIG. 10 shows a head mounted device according to the invention. The head mounted device 1000 includes two displays 1002 and 1004 positioned in front of the user's left and right eye respectively. The displays are magnified by an optical element between the eye and the display and can thus simulate a realistic environment to the user. In operation, the displays are mounted so as to be fixed to the user's head 1006 through a body 1008 and the relative position of the displays 1002 and 1004 with respect to the eyes remains unchanged. Therefore a change of orientation of the user's head, e.g. a rotation around the neck or a tilting of the head, makes it necessary to change the displayed images in order to maintain the illusion of a realistic environment. The head mounted display has a tracking device 1010 for keeping track of the orientation of the head of the user. The head mounted display is connected to a system that generates the images to be displayed. The connection can be realized via a cable, infrared, high frequency or other type of link and is symbolized by a box 1012. This link is used to send data concerning the tracking of the head from the head mounted display to the related system and to send the images from the system to the head mounted display. In a preferred embodiment, the tracking device 1010 is the tracking device shown in FIG. 9.

Figure 11:
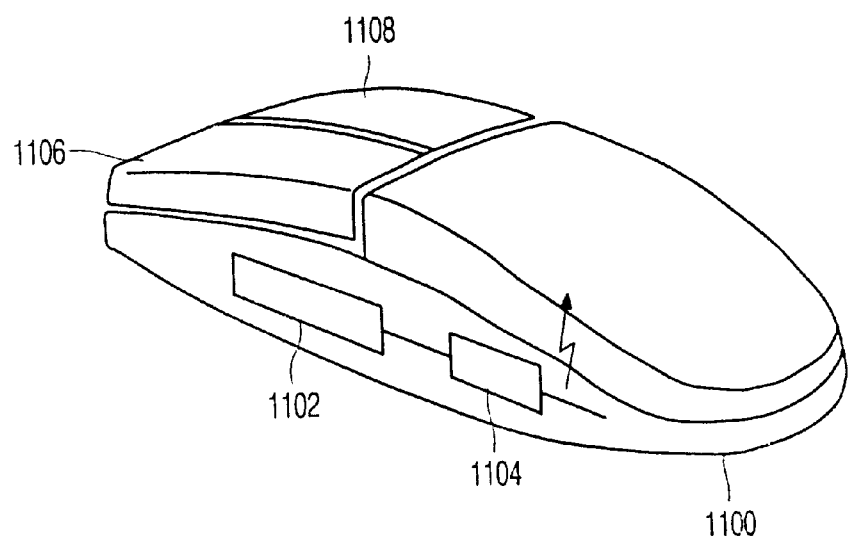

FIG. 11 schematically shows a mouse according to the invention. The mouse 1100 has a tracking device 1102 that keeps track of the orientation of the mouse. The mouse also has a communication link 1104 for sending data to the system which is responsive to input from the mouse. The mouse is used to control the movement of a cursor or other indicium on the screen of the system. A change of orientation of the mouse results in a change of the position of the cursor. For example a rotation to the right causes the cursor to move to the right and an upward rotation causes the cursor to move towards the top of the screen. The mouse according to the invention does not need a surface to operate on but can be held in the hand. This is particularly advantageous for applications in systems involving selections from various menus, like an information retrieval application where information is retrieved from a database. The mouse is also provided with push buttons 1106 and 1108 for entering commands or confirming an action in the system. Pressing of such a button is also signalled to the system via the communication link 1104. The tracking device 1102 can be realized as one of the tracking devices described above.

The application of the acceleration sensor and the tracking device according to the invention is not limited to a head mounted display or a mouse. Further applications include horizontal alignment of car headlights, orientation of a mobile phone or a shaver, orientation of a portable display device, electronic level for e.g. constriction work, creation of an artificial horizon, tracking of other body parts for virtual reality, shock sensing for air bags, and rotation sensing for car and motor alarms.

What is claimed is:

1. An acceleration sensor comprising:
    a housing with a chamber which has a cross section in a first plane;
    an inductance influencing member which resides inside the chamber and has a circular cross section in the first plane; and
    a first coil which is inductively coupled to the inductance influencing member, first coil being positioned in a second plane outside the chamber, the second plane not being parallel to the first plane,
    wherein the inductance influencing member comprises a non-magnetic, conducting material.

2. An acceleration sensor according to claim 1, in which the difference between the diameter of the cross section of the chamber and the diameter of the circular cross section of the member is less than 1/10 of the diameter of the cross section of the member, and in which the first coil has an outer diameter which is less than 1/3 of the diameter of the cross section of the member.

3. An acceleration sensor according to claim 1, provided with a second coil positioned in a third plane outside the chamber, the third plane being substantially parallel to the second plane and the first and second coil being positioned symmetrically with respect to the center of the cross section of the chamber.

4. An acceleration sensor according to claim 1 comprising six coils in six respective planes in a cubic arrangement, wherein
    the chamber has a spherical shape inside,
    the inductance influencing member has a spherical shape, and
    the coils are positioned symmetrically with respect to the center of the chamber.

5. An acceleration sensor according to claim 1, wherein the chamber contains a fluid between the inductance influencing member and the inside of the chamber, in order to damp movement of the inductance influencing member.

6. A tracking device for detecting the orientation in at least one direction, the device comprising:
    an acceleration sensor comprising
        a housing with a chamber which has a cross section in a first plane,
        an inductance influencing member which resides inside the chamber and has a circular cross section in the first plane, and
        a first coil which is inductively coupled to the inductance influencing member, the first coil being positioned in a second plane outside the chamber, the second plane not being parallel to the first plane, and
    first signal means for generating on the basis of an actual self induction of at least the first coil, a first signal representative of an orientation of the device with respect to an acceleration direction,
    wherein the inductance influencing member comprises a non-magnetic, conducting material.

7. A tracking device according to claim 6, comprising:
    a magnetic sensor for determining at least one component of the geomagnetic field,
    second signal means for generating, on the basis of the at least one component determined, a second signal representative of the orientation of the device with respect to the geomagnetic field, and
    combining means for combining the first signal and the second signal into a combined signal representative of the orientation of the device.

8. A tracking device for detecting the orientation in at least one direction, the device comprising:
    an acceleration sensor comprising
        a housing with a chamber which has a cross section in a first plane,
        an inductance influencing member which resides inside the chamber and has a circular cross section in the first plane, and
        a first coil including windings which is inductively coupled to the inductance influencing member, first coil being positioned in a second plane outside the chamber, the second plane not being parallel to the first plane,
        the inductance influencing member having a spherical shape, the windings being positioned symmetrically with respect to the center of the chamber, and
        the inductance influencing member comprising a permanent magnet,
    position detecting means for detecting an actual position of the inductance influencing member relative to a center of the chamber on the basis of an actual self induction of the first coil,
    control means for applying on the basis of the actual position determined currents to the first coil in order to force the inductance influencing member towards the center of the chamber, and
    first signal means for generating, on the basis of the currents applied, a first signal representative of an orientation of the device with respect to an acceleration direction,
    wherein the inductance influencing member comprises a non-magnetic, conducting material.

9. A tracking device according to claim 8, comprising:
    a magnetic sensor for determining at least one component of the geomagnetic field,
    second signal means for generating, on the basis of the at least one component determined, a second signal representative of the orientation of the device with respect to the geomagnetic field, and
    combining means for combining the first signal and the second signal into a combined signal representative of the orientation of the device.

10. A head mounted display including a tracking device, the tracking device comprising:
    an acceleration sensor comprising
        a housing with a chamber which has a cross section in a first plane,
        an inductance influencing member which resides inside the chamber and has a circular section in the first plane, and
        a first coil which is inductively coupled to the inductance influencing member, the first coil being positioned in a second plane outside the chamber, the second plane not being parallel to the first plane, and
    first signal means for generating on the basis of an actual self induction of at least the first coil, a first signal representative of an orientation of the device with respect to an acceleration direction, wherein the inductance influencing member comprises a non-magnetic, conducting material.

11. A mouse provided with a tracking device, the tracking device comprising:

an acceleration sensor comprising
a housing with a chamber which has a cross section in a first plane,
an inductance influencing member which resides inside the chamber and has a circular cross section in the first plane, and
a first coil which is inductively coupled to the inductance influencing member, the first coil being positioned in a second plane outside the chamber, the second plane not being parallel to the first plane, and
first signal means for generating on the basis of an actual self induction of at least the first coil, a first signal representative of an orientation of the device with respect to an acceleration direction,
wherein the inductance influencing member comprises a non-magnetic, conducting material.

12. A head mounted display including a tracking device, the tracking device including:

an acceleration sensor comprising:
a housing with a chamber which has a cross section in a first plane,
an inductance influencing member which resides in the chamber and has a circular cross section in the first plane, and
a first coil which is inductively coupled to the inductance influencing member, the first coil being positioned in a second plane outside the chamber, the second plane not being parallel to the first plane,
the inductance influencing member having a spherical shape, the windings being positioned symmetrically with respect to the center of the chamber, and the inductance influencing member comprising a permanent magnet,
position detecting means for detecting an actual position of the inductance influencing member relative to a center of the chamber on the basis of an actual self induction of the first coil,
control means for applying on the basis of the actual position determined currents to the first coil in order to force the inductance influencing member towards the center of the chamber, and
first signal means for generating, on the basis of the currents applied, a first signal representative of an orientation of the device with respect to an acceleration direction,
wherein the inductance influencing member comprises a non-magnetic conducting material.

13. A head mounted display according to claim 12, further comprising:

a magnetic sensor for determining at least one component of the geomagnetic field, second signal means for generating, on the basis of the at least one component determined, a second signal representative of the orientation of the device with respect to the geomagnetic field, and combining means for combining the first signal and the second signal into a combined signal representative of the orientation of the device.

14. A mouse including a tracking device, the tracking device including:

an acceleration sensor comprising:
a housing with a chamber which has a cross section in a first plane,
an inductance influencing member which resides in the chamber and has a circular cross section in the first plane, and
a first coil including windings which is inductively coupled to the inductance influencing member, the first coil being positioned in a second plane outside the chamber, the second plane not being parallel to the first plane,
the inductance influencing member having a spherical shape,
the windings being positioned symmetrically with respect to the center of the chamber, and the inductance influencing member comprising a permanent magnet,
position detecting means for detecting an actual position of the inductance influencing member relative to a center of the chamber on the basis of an actual self induction of the coils,
control means for applying on the basis of the actual position determined currents to the first coil in order to force the inductance influencing member towards the center of the chamber, and
first signal means for generating, on the basis of the currents applied, a first signal representative of an orientation of the device with respect to an acceleration direction
wherein the inductance influencing member comprises a non-magnetic, conducting material.

15. A mouse according to claim 14, further comprising:

a magnetic sensor for determining at least one component of the geomagnetic field, second signal means for generating, on the basis of the at least one component determined, a second signal representative of the orientation of the device with respect to the geomagnetic field, and combining means for combining the first: signal and the second signal into a combined signal representative of the orientation of the device.

* * * * *